(12) United States Patent
Ahya et al.

(10) Patent No.: US 6,600,928 B1
(45) Date of Patent: Jul. 29, 2003

(54) METHOD FOR ESTABLISHING A TEMPORARY SIMPLEX CALL GROUP IN A WIRELESS COMMUNICATION SYSTEM

(75) Inventors: Deepak Ahya, Plantation, FL (US); Adeel Mukhtar, Coconut Creek, FL (US)

(73) Assignee: Motorola, Inc., Schaumburg, IL (US)

( * ) Notice: Subject to any disclaimer, the term of this patent is extended or adjusted under 35 U.S.C. 154(b) by 485 days.

(21) Appl. No.: 09/706,558

(22) Filed: Nov. 6, 2000

(51) Int. Cl.[7] .............................. H04B 7/00; H04Q 7/20
(52) U.S. Cl. ..................... 455/518; 455/519; 455/512; 455/422; 455/509; 455/503; 455/520; 370/312; 370/335; 370/342; 370/390; 370/338
(58) Field of Search ................................ 455/518, 519, 455/512, 422, 509, 503, 520; 370/312, 335, 342, 390, 338

(56) References Cited

U.S. PATENT DOCUMENTS

| | | | |
|---|---|---|---|
| 5,724,648 A | * 3/1998 | Shaughnessy et al. | 455/519 |
| 5,758,291 A | * 5/1998 | Grube et al. | 455/518 |
| 5,850,611 A | * 12/1998 | Krebs | 455/518 |
| 6,141,347 A | * 10/2000 | Shaughnessy et al. | 370/390 |
| 6,298,058 B1 | * 10/2001 | Maher et al. | 370/390 |
| 6,301,263 B1 | * 10/2001 | Maggenti | 370/462 |

\* cited by examiner

*Primary Examiner*—Lee Nguyen
*Assistant Examiner*—Marceau Milord
(74) *Attorney, Agent, or Firm*—Scott M. Garrett

(57) ABSTRACT

A user who desires to establish a temporary talk group first requests a temporary group identifier, then the user specifies the talk group membership and a validity period. The temporary talk group can be set up using a mobile communication device, or by use of a computer which connects with a service provider's server over the Internet.

6 Claims, 3 Drawing Sheets

METHOD FOR ESTABLISHING A TEMPORARY SIMPLEX CALL GROUP IN A WIRELESS COMMUNICATION SYSTEM

TECHNICAL FIELD

This invention is generally related to communication devices and more particularly to wireless communication devices which are capable of simplex communication, and more particularly to devices capable of talk group simplex communication.

BACKGROUND

Simplex communication systems are presently utilized in many regions and areas. Examples of which include public safety communication systems and other dispatch communication systems. Simply put, simplex communications means a user can either talk, or listen, but not both at the same time. Such communications include very simple systems such as unit to unit communications, more commonly known as, for example, walkie-talkies or handy talkies, and can be very complex, using a fixed equipment network such as that found in modern digital wireless mobile communication systems.

One advantage of a more sophisticated simplex system is the ability for one user to be heard by many others at the same time. Often this is referred to as dispatch communications. A typical dispatch communication system is a private communication system. That is, they belong to organizations who do not share their communication resources with the public in general. More recently, communication service providers have been offering simplex communication service to the public in general. This allows smaller organizations to take advantage of the benefits of simplex communication, without having to purchase and maintain their own equipment. Furthermore, service providers allows small organizations to set up what are referred to as talk groups. A talk group is a group of users, or more particularly, the mobile stations used by the users associated with the talk group, and when the talk group is used, all other users presently active will hear the voice of the user presently speaking. Talk groups allow small organizations to set up what functions as a conventional dispatch communication system.

To establish a talk group in present simplex communication systems, a group or organization must request the service provider to provision the group. Typically the requesting party submits a list of the desired users to be included in the group. However, within large organizations it is often desired to set up a temporary talk group of a small number of people for a short time. The present method of contacting a representative of the service provider with a request, waiting for the request to be processed, and so on, is too slow in many instances. There is, therefore, a need for a method of establishing a temporary talk group which does not require manual intervention by the service provider.

DETAILED DESCRIPTION OF THE PREFERRED EMBODIMENT

Figure 1:
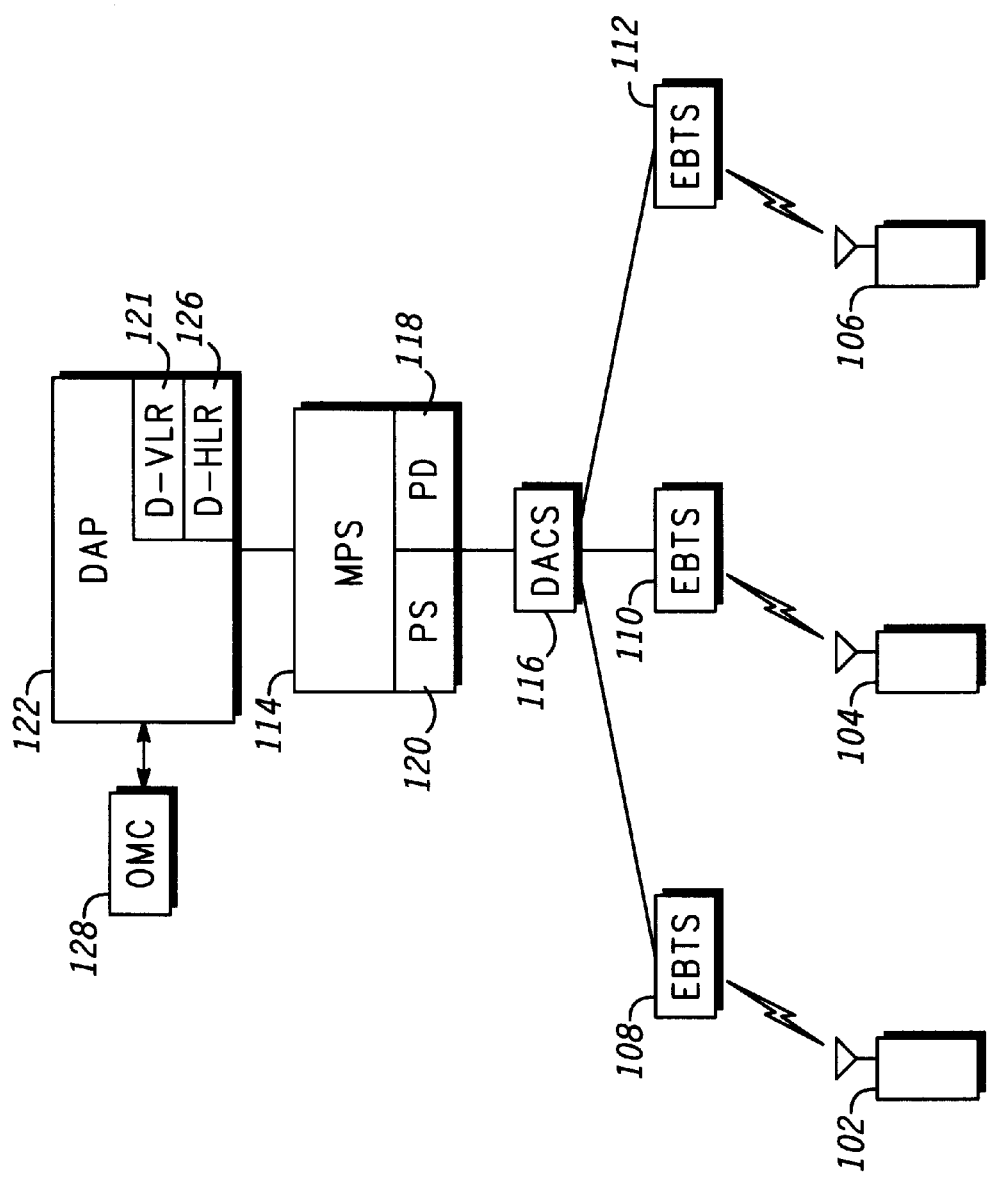
FIG. 1 shows a block diagram of a simplex communication system, in accordance with the invention.

While the specification concludes with claims defining the features of the invention that are regarded as novel, it is believed that the invention will be better understood from a consideration of the following description in conjunction with the drawing figures, in which like reference numerals are carried forward. A brief description of the prior art is also thought to be useful.

The invention solves the problem of not being able to create talk groups easily, by a user, by providing a method for creating a temporary talk group in cooperation with the wireless communication system infrastructure equipment. In particular, the method provides alternative means to interact with the communication system in defining the membership of the talk group, and the period for which the temporary talk group is valid.

Referring now to FIG. 1, there is shown a block diagram 100 of a simplex communication system, in accordance with the invention. There are a plurality of mobile stations, such as mobile stations 102, 104, and 106. For the sake of example, each of these mobile stations are affiliated with a serving cell established in the vicinity of enhanced base transceiver sites (EBTS) 108, 110, and 112, respectively. The mobile stations are capable of engaging in a simplex mode of communication, which means that as one user talks, the receiving user can only listen, and vice-versa. Simplex communication is commonly referred to as a "push to talk" mode of communicating, referring to a so-called push to talk button, which, when pressed, causes the users voice signal to be transmitted. The mobile stations may also be capable of engaging in duplex communication, such as telephony. Typically, a group of base sites are operatively coupled to a metro packet switch (MPS) 114 through, for example, a digital access cross-connect switch (DACS) 116. The DAC is a digital switch which routes digital signals between the EBTSs and the MPS as appropriate. The MPS comprises a packet duplicator 118 and a packet data switch 120. The packet duplicator replicates digital voice packets received by one user, which are then forwarded to other users in a given talk group. In this way each member of the talk groups hears the present speaker at substantially the same time. The packet data switch 120 facilitates packet data network transactions, like a gateway, and permits network connectivity to, for example, the Internet. In general the MPS routes simplex voice data packets and control signaling to the various base sites.

The MPS is operatively coupled to a simplex communications agent processor, such as a dispatch application processor (DAP) 122. The DAP oversees all simplex communication and performs related administrative functions. It comprises a dispatch visit location register (D-VLR) 124 and a dispatch home location register (D-HLR) 126. These both operate and function similar to the VLR and HLR found in conventional mobile switch centers. The D-VLR is used by the communication system when a mobile station registers for service, while the D-VLR is used by the system to keep track of which serving cell a given mobile station is in presently. IN general, the DAP performs resource management, resource usage tracking for billing or auditing purposes, location tracking with the D-VLR, and subscriber access control using the D-HLR. The DAP maintains a list of talk groups and their membership, and affiliates a talk group identifier with each talk group. The DAP is also operatively coupled to an operations and maintenance center 128. According to the present invention, the DAP can facilitate temporary talk groups, and temporary talk group identifiers. The DAP comprises logical and physical components and computing resources, including memory for storing talk group lists.

Figure 2:
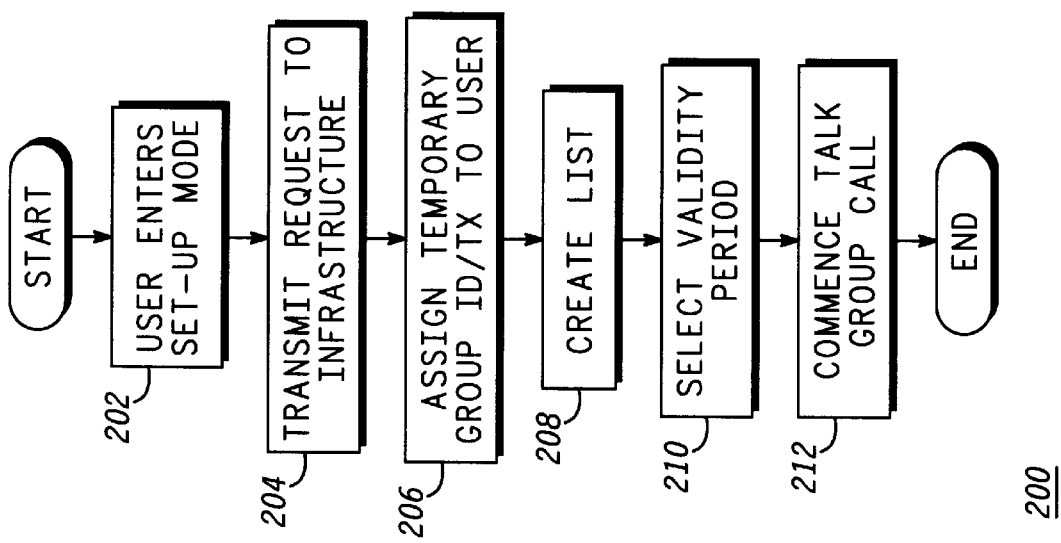
FIG. 2 shows a flow chart diagram of a method for establishing a temporary talk group, in accordance with the invention.

Referring now to FIG. 2, there is shown a flow chart diagram 200 of a method for establishing a temporary simplex call talk group, in accordance with the invention. The method begins with a mobile station in FIG. 1 registered for service, and ready to establish a temporary talk group on the wireless simplex communication system of FIG. 1. In establishing the temporary talk group, the mobile station will transact with the DAP, and the temporary talk group list will be stored at the DAP until the temporary talk group is no longer active.

The first step in establishing a temporary talk group is performed by a user, which is selecting a temporary talk group set-up mode (202). There are a couple ways this can be performed. First, the mobile station may be provided with logical and software components to perform this function. Second, a software application residing on a general purpose computer, coupled to the DAP over a network, can be used. The set-up mode presents the user with an interface for requesting a temporary talk group identifier, and specifying the temporary talk group membership of subscribers. The precise implementation of the set-up mode and associated interfaces are a matter of design choice.

Once the set-up mode has been invoked, and the set-up interface instantiated, the user requests the establishment of a temporary talk group by transmitting a request (204) to the infrastructure equipment, such as the DAP of FIG. 1. When the infrastructure equipment receives the request, it may first check with the D-HLR to see if the requesting subscriber has sufficient privileges to establish a temporary talk group. If so, it allocates the appropriate resources, and selects an identifier for which to identify the temporary talk group, and associated membership. The next step, then, is for the infrastructure equipment to select and assign (a temporary group identifier to be used in association with the temporary talk group presently being created. The infrastructure equipment transmits the temporary group identifier to the device making the request in step 204. Once the requesting device receives the temporary group identifier, it alerts the user that talk group membership may now be specified.

The user then commences creating the temporary talk group list (208). This step can be accomplished in a variety of ways. The easiest being for the user to list the mobile station identifiers of all other users the requesting user wishes to include in the temporary talk group. The plurality of identifiers can be sent all once, or the identifiers can be sent one at a time. Alternatively, aliases may be presented to the infrastructure equipment, which then resolves the aliases to obtain the identifiers to be included. The identifiers may be, for example, international mobile equipment identifiers (IMEI), or identifiers or aliases assigned to mobile stations by the wireless service operator. The identifier will be specified in particular subscriber's record stored on the D-HLR.

In addition to selecting the temporary talk group membership, the user who is establishing the temporary talk group also selects validity period (210) for which the temporary talk group is to be maintained. Periodically the infrastructure equipment will audit the temporary talk groups and eliminate those which have expired. Alternatively, if the user does not provide a validity period, the infrastructure equipment may use a default period. Once the user has decided on a validity period, the validity period is transmitted to the infrastructure equipment. The selection of a validity period may occur before or after selecting temporary talk group membership.

Once the temporary talk group is set-up, the members need to be informed of the inclusion in the newly established temporary talk group. There are a variety of methods for accomplishing this. Preferably the record at the D-HLR of each of the members is updated to reflect inclusion in the new talk group. This facilitates the infrastructure equipment in allowing only members of the talk group to use the talk group. When each of the members of the talk group first register for service after the talk group has been established, a control message can be sent to the mobile station to update the mobile station's local memory, and provide access to the talk group. Propagating the talk group identifier is preferable in this manner so that the users can readily use the temporary talk group without having to further program their respective mobile stations. Each mobile station need only receive the talk group identifier, to be used in subsequent talk group calls, but it is also contemplated that the entire group membership can be sent as well so that the user can peruse the group membership and see who else has been included. In doing so, the mobile station may look within records stored locally at the mobile station to associate aliases of known users with identifiers specified in the membership list.

Once the temporary talk group is established, the members may commence a simplex talk group call. Since mobile stations are already capable of initiating such calls, it is merely a matter of specifying the desired talk group by selecting the temporary talk group identifier assigned to the temporary talk group in step 206. If the mobile stations have not yet updated their local records, they may still be included in the talk group call because the infrastructure equipment has a record of them being members of the talk group. If the D-VLR, for example, indicates that such a mobile station is presently registered for service, it can commence paging the mobile station in the normal fashion, and it is contemplated that at that time the mobile station may update its local records to reflect inclusion in the new talk group.

Figure 3:
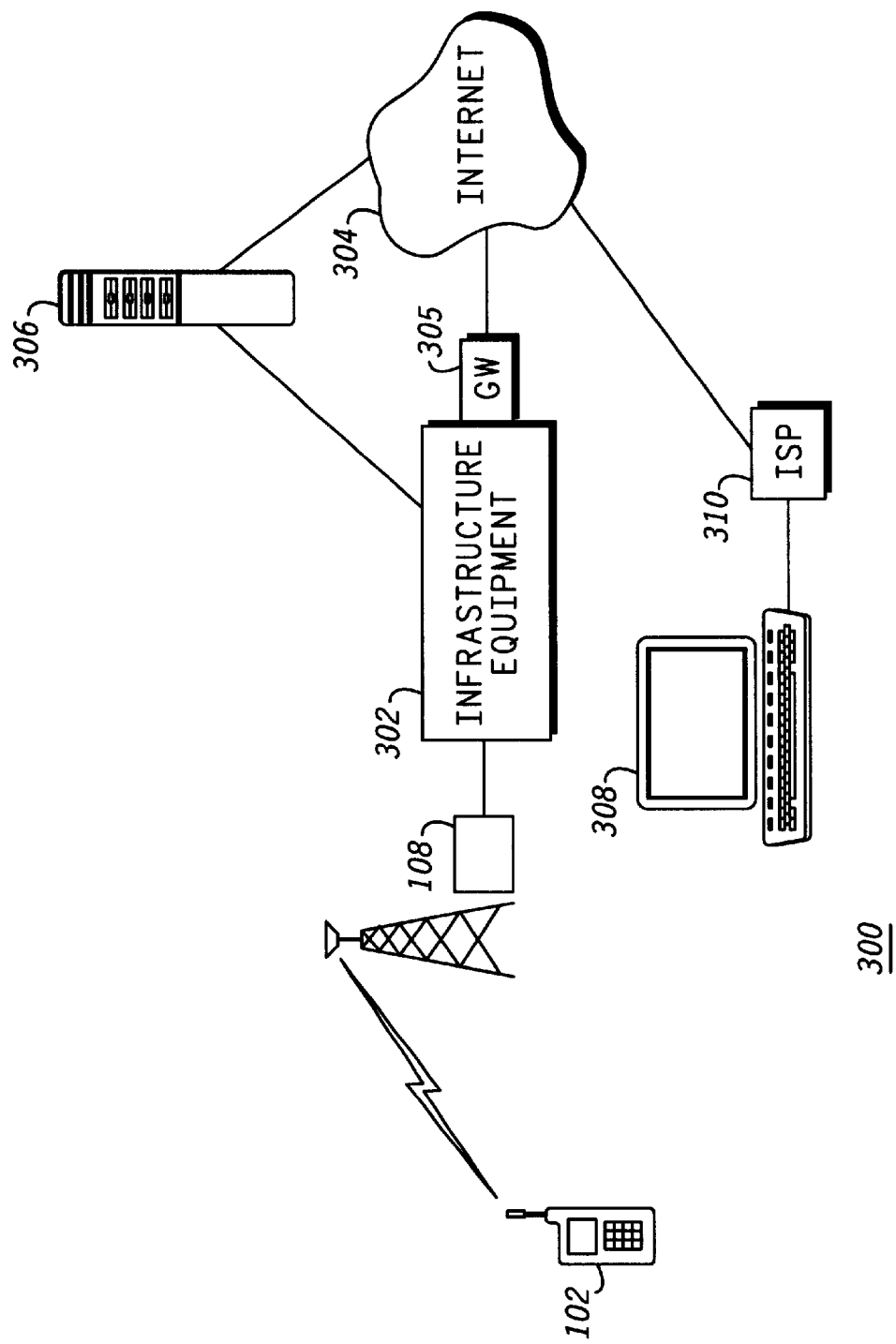
FIG. 3 shows a block diagram of a wireless communication system coupled to the Internet for establishing a temporary talk group, in accordance with the invention.

Referring now to FIG. 3, there is shown a block diagram of a wireless communication system 300 coupled to the Internet for establishing a temporary talk group, in accordance with the invention. This illustration reflects the contemplation that several alternative means of setting up the temporary talk group may be used. First, a simple, proprietary interface my be provided on each mobile station, such as mobile station 102, which allows the user to transact directly with the infrastructure equipment 302, which includes equipment such as the MPS and DAP. This solution is the only one available if the service providing system is closed, and not connected to other networks, such as the Internet. Essentially, an ergonomic layer of software would be needed with which to create the interface.

A first alternative also uses the mobile station, but instead of a closed system, the method takes advantage of the system being connected to a network, and the mobile station having a means for utilizing that network, such as, for example, a microbrowser. A microbrowser is a software application that allows a user to view and interact with information provided on a server. Many mobile stations and hand held, or portable communication devices are now commonly provided with such technology. There are a variety of ways such devices can gain access to networks, such as circuit data and packet data. In this alternative, the user instantiates or invokes the microbrowser. The connection traverses the wireless infrastructure 302, and accesses, for example, the Internet 304, perhaps through a gateway 305, and connects to an account server 306. The microbrowser and account server establish a client-server communication session. The account server is preferably operated by the service provider operating the infrastructure equipment. In that sense, the account server 306 is considered to be part of the infrastructure equipment, but is set forth separately here for clarification. Once connected to the account server 306, the server sends data to the mobile station where the microbrowser renders an interface, and presents options to the user. Of the options presented is one for creating a temporary talk group. The user can request the creation of a temporary talk group, and the server then can interact with other infrastructure equipment to determine if the request can be satisfied. Using the microbrowser, the user can enter the identifiers of other talk group members, the validity period, etc. In response, the server can provide feedback to the user as to the status of the talk group.

A third alternative in creating a temporary talk group is to establish the temporary talk group by means of a general purpose computer 308, connected to the server 306 over a network or Internet. The user uses a browser application on the computer 308, and connects to the server 306, perhaps by use of an internet service provider (ISP) 310. From there the method is much the same as the second alternative described hereinabove, the use of a microbrowser on the mobile station. The server and the computer interact.

With both the second and third alternatives, when finished, the server relays the information about talk group membership and validity period to the other infrastructure equipment, so that records of the list members may be updated, control messages may be sent out, and so on. Therefore, the present method for establishing a temporary simplex talk group in a wireless communication system comprises initiating a talk group call set-up mode at a mobile station; requesting a temporary group identifier from a wireless communication infrastructure; receiving the temporary group identifier at the mobile station; creating a temporary group list comprised of a plurality of identifiers, each of the plurality of identifiers corresponding to a subscriber to be included in the temporary simplex call group; affiliating the temporary group list with the temporary group identifier; selecting a validity period for the temporary simplex call group; and transmitting the validity period and the temporary group list to the wireless communication infrastructure. Wherein the wireless communication infrastructure maintains the temporary simplex call group for a period of time equal to the validity period. The talk group members are preferably notified, either over the air after the talk group is created, or upon their next registration for service. Once established, any member can then talk to all other members of the talk group simultaneously. This method eliminates the need of requesting provisioning of the talk group by personnel working for the service provider, and will lower the cost of talk group communication.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for establishing a temporary simplex talk group in a wireless communication system, comprising:
   initiating a talk group call set-up mode at a mobile station;
   requesting a temporary group identifier from a wireless communication infrastructure;
   receiving the temporary group identifier at the mobile station;
   creating a temporary group list comprised of a plurality of identifiers, each of the plurality of identifiers corresponding to a subscriber to be included in the temporary simplex call group;
   affiliating the temporary group list with the temporary group identifier;
   selecting a validity period for the temporary simplex call group; and
   transmitting the validity period and the temporary group list to the wireless communication infrastructure;
   wherein the wireless communication infrastructure maintains the temporary simplex call group for a period of time equal to the validity period.

2. A method for establishing a temporary conference call group as defined in claim 1, further comprising initiating a temporary simplex call using the temporary group identifier.

3. A method for establishing a temporary conference call group as defined in claim 1, further comprising transmitting the temporary talk group identifier to other mobile stations corresponding to the plurality of identifiers.

4. A method for establishing a temporary simplex talk group in a wireless communication system, comprising:
   invoking a microbrowser on a mobile station;
   establishing a client-server communication session with an account server using the microbrowser;
   requesting a temporary talk group identifier from the account server with the micro browser;
   receiving the temporary group identifier at the mobile station;
   creating a temporary group list comprised of a plurality of identifiers, each of the plurality of identifiers corresponding to a subscriber to be included in the temporary simplex call group;
   affiliating the temporary group list with the temporary group identifier;
   selecting a validity period for the temporary simplex call group; and
   transmitting the validity period and the temporary group list to the account server;
   transmitting the validity period and the temporary group list to a wireless communication infrastructure;
   wherein the wireless communication infrastructure maintains the temporary simplex call group for a period of time equal to the validity period.

5. A method for establishing a temporary conference call group as defined in claim 4, further comprising initiating a temporary simplex call using the temporary group identifier.

6. A method for establishing a temporary conference call group as defined in claim 4, further comprising transmitting the temporary talk group identifier to other mobile stations corresponding to the plurality of identifiers.

* * * * *